United States Patent [19]

Lipner et al.

[11] Patent Number: 4,815,014

[45] Date of Patent: Mar. 21, 1989

[54] MACHINE ASSISTED EXECUTION OF PROCESS OPERATING PROCEDURES

[75] Inventors: Melvin H. Lipner, Monroeville; Roger A. Mundy, North Huntingdon, both of Pa.; Victor N. K. Impink, Ellicott City, Md.

[73] Assignee: Westinghouse Electric Corp., Pittsburgh, Pa.

[21] Appl. No.: 20,285

[22] Filed: Feb. 27, 1987

[51] Int. Cl.[4] .......................... G21C 7/36; G06F 9/06
[52] U.S. Cl. .................................. 364/550; 364/188; 364/300; 376/216
[58] Field of Search ............... 364/550, 551, 494, 146, 364/188, 191, 900 MS File; 376/215–218, 245, 249

[56] References Cited

U.S. PATENT DOCUMENTS

| | | | |
|---|---|---|---|
| 4,488,258 | 12/1984 | Struger et al. | 364/146 |
| 4,552,718 | 11/1985 | Impink, Jr. et al. | 376/216 |
| 4,628,444 | 12/1986 | Nozawa et al. | 364/188 |
| 4,632,802 | 12/1986 | Herbst et al. | 376/216 |

OTHER PUBLICATIONS

The Human Factors Society-Getting Lost:A Case Study in Interface Design-W. C. Elm, D. D. Woods, Sep. 1985, Baltimore, Maryland, Annual Meeting Human Factor's Society.
A Computerized Emergency Procedures System for a Pressurized Water Reactor-M. H. Lipner, et al. Sep., 1985, Pasco, Washington.
Westinghouse ON CALL COMPRO (Computerized Procedures) 1984, Pittsburgh, Pennsylvania.

*Primary Examiner*—Parshotam S. Lall
*Assistant Examiner*—David Goldman
*Attorney, Agent, or Firm*—D. C. Abeles

[57] ABSTRACT

A computer based system aids an operator in proceeding step-by-step through procedures for a complex process facility. At each step, monitored plant parameter values are used to evaluate relevant plant status and recommend action to be taken. The status and recommended action are presented to the operator on a display device together with prompts for generating appropriate responses. The step logic is carried out repetitively to provide the operator with feedback and to verify operator actions. The complete display picture including operator responses, and other plant conditions monitored in parallel with the current step, is logged for later review. An online review feature permits review of plant conditions and operator actions while the operator continues to execute the procedure. High-level textual statements of all steps of a current procedure can be reviewed and prior steps can be executed or re-executed.

17 Claims, 7 Drawing Sheets

```
00:12:40                            © Westinghouse Electric Corp. 1986
┌─┬─┐
│S(g)│(r)│                    CAUTION: (b)
│C│H│(y)
├─┼─┤                      CORE COOLANT IN RED (b)
│P(g)│Z(g)│I(g)│
└─┴─┴─┘
```

FR-H.1: RESPONSE TO LOSS OF HEAT SINK (w)

09  LOSS OF SECONDARY HEAT SINK          VERIFIED (w)

10  SAFETY INJECTION                     ACTUATED (w)

- - - - - - - - - - - - - - - - - - - - - - - - - -

11  RCS FEED PATH                        VERIFIED (g)
    CHARGING/SI PUMP A                   RUNNING (g)
    CHARGING/SI PUMP B                   RUNNING (g)
    SI VALVE ALIGNMENT                   VERIFIED (g)

MANUALLY START PUMPS (y)

- - - - - - - - - - - - - - - - - - - - - - - - - -

12  SI                                   TO BE RESET (w)

13  CONTAINMENT ISOLATION PH A & B       TO BE RESET (w)

ACTION              [y] ACTION
COMPLETED               OVERRIDDEN (y)

FIG. 3.

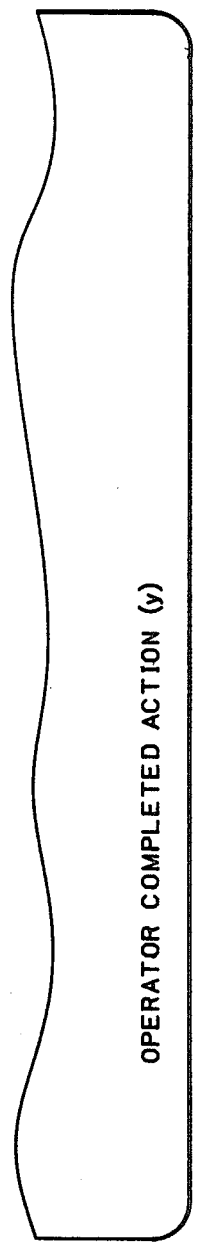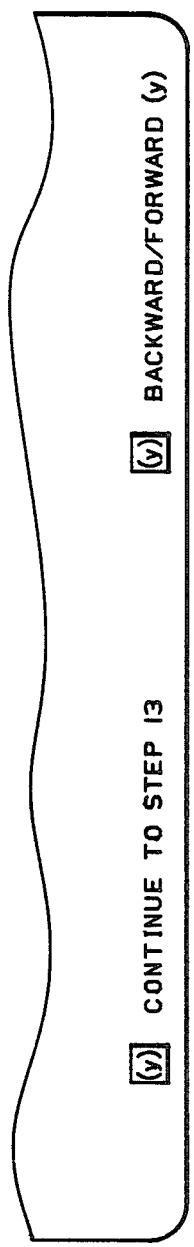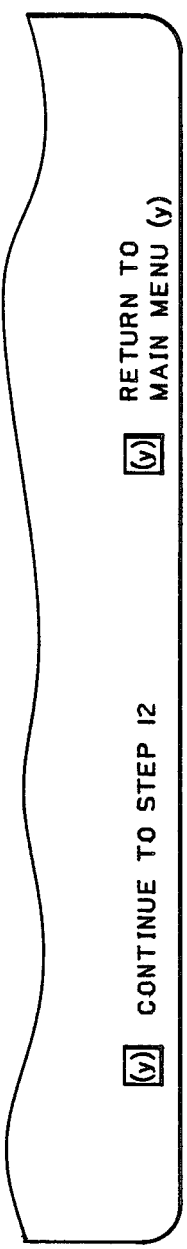
FIG. 5.
FIG. 6.
FIG. 9.

00:14:10

| S (g) | | |
|---|---|---|
| C (r) | | |
| H (y) | | |
| P (g) | | |
| Z (g) | | |
| I (g) | | |

© Westinghouse Electric Corp. 1986

CAUTION: (b)

CORE COOLANT IN RED (b)

FR-H.1: RESPONSE TO LOSS OF HEAT SINK (w)

I1 RCS FEED PATH    VERIFIED (w)

I2 RESET SI      RESET (w)

I1 RCS FEED PATH    VERIFIED (g)
  CHARGING/SI PUMP A RUNNING (g)
  CHARGING/SI PUMP B RUNNING (g)
  SI VALVE ALIGNMENT VERIFIED (g)

I2 SI        TO BE RESET (w)
I3 CONTAINMENT ISOLATION PH A & B TO BE RESET (w)

[y] CONTINUE    [y] OVERRIDE (y)

FIG. 8.

MACHINE ASSISTED EXECUTION OF PROCESS OPERATING PROCEDURES

Related Application

U.S. patent application Ser. No. 825,427 filed Feb. 3, 1986.

BACKGROUND OF THE INVENTION

1. Field of the Invention

This invention is directed to a method and apparatus for aiding an operator in executing step-by-step procedures during the operation of a complex process facility such as a nuclear power plant. More particularly, it involves a computer based system which incorporates monitored plant data and interactive plant operator responses to recommended actions for step-by-step progression through a selected procedure and includes verification of operator responses, on-line review of completed steps, and logging of all data pertinent to procedure execution.

2. Background Information

As large process facilities become more complex, the burden placed on the operator to assimilate large amounts of data, evaluate the status of the process and various components and systems from those data, and take informed, decisive action based upon such evaluations becomes greater. Such a complex process facility where this is true is the nuclear power plant.

Due to concern for public safety and to the significance of nuclear power generation to the world, there has been steadily increasing emphasis on the need to operate nuclear power plants safely and reliably. To satisfy this need, written procedures have been developed to guide the operator in controlling the plant. However, many of these procedures are difficult for the operator to manage in a purely paper format because they require him to continuously monitor and comprehend numerous plant conditions over an extended period of time.

Several attempts have been made to alleviate this problem. One such attempt has resulted in the safety parameter display system covered by U.S. Pat. No. 4,552,718. This system generates meaningful information for the operator of a pressurized water reactor (PWR) on six critical safety functions which must be maintained, or reestablished if lost, during emergency operation. The system uses a status tree approach to generate automatically, or through manual responses by an operator, a visual indication of the current status of all six critical safety functions. This system is used in conjunction with the paper procedures t alert the operator, who is absorbed in the steps of a particular emergency procedure, to the overall condition of the plant. While the status tree system advises the operator of any threats to the critical safety functions, and suggests a procedure to be followed, the operator must still locate the recommended procedure in the paper procedures and then follow it manually step-by-step. The status tree system also does not keep the operator apprised of other plant conditions which the paper procedures require be monitored, but which do not directly affect the critical safety functions.

U.S. patent application Ser. No. 825,427 filed on Feb. 3, 1986, and referred to above under the heading, Related Application, is directed to a computer based system which both assesses the plant data and provides guidance in light of predefined procedures. In this system, current plant data are used by the computer to trace a path through the logic of appropriate procedure steps in order to identify a recommended course of action. The course of action along, with related data, is displayed for the operator on one or more electronic display devices. The computer then uses the plant data and the operator's interactive response to proceed to the next appropriate procedure step. In addition, the computer simultaneously monitors certain functions which must normally be continuously monitored by the operator. If a problem becomes apparent in any of these functions, the operator is alerted and appropriate actions are displayed. In this manner, the operator is relieved of the duty of continually gathering and assessing large amounts of data, as required by the purely paper form of the procedures. This frees the operator to concentrate on operating the plant in a safe manner when hazardous conditions are not present, and to alleviate potential emergency situations when hazardous conditions exist.

Although this computer based system performs its intended function, development and testing uncovered some areas where improvements in performance of the system could be made.

Hence, it is the primary object of the subject invention to provide improved apparatus and method for a computer based system for assisting the operator of a complex process facility in carrying out step-by-step procedures.

It is a more specific object of the invention to provide such an apparatus and method in which the operator maintains control of procedure implementation, but in which progression cannot be made to the next step until an action taken by the operator has been verified by the plant sensors, or until the operator overrides the system.

It is another object of the invention to provide such an apparatus and method which assists the operator in detecting malfunctioning equipment.

It is still another object of the invention to provide such an apparatus and method which permits on-line review of prior steps without interrupting execution of the current step.

Yet another object of the invention is to provide such an apparatus and method with improved logging capability.

SUMMARY OF THE INVENTION

These and other objects are realized by a method and apparatus for on-line, machine assisted execution by a human operator of procedures for a complex process facility in which the steps of a selected procedure stored in computer memory are sequentially presented to the operator on a display device. Process parameter signals are repetitively processed to automatically determine the status of a process condition addressed by the current step. Where the process condition is not verified by the parameter values, a visible textual statement of recommended operator action is presented on a display device together with instructions for the operator to generate an "ACTION COMPLETED" or "OVERRIDE" response. If the operator performs the recommended action, the repetitive processing of the parameter signals will detect a change in the associated parameter value and update the process condition. Then, when the operator enters an "ACTION COMPLETED" response, the next step in the procedure is selected as the current step. If the process condition is not verified when the operator enters an "ACTION COM- PLETED" response, the next step will not be selected, and the step logic is repeated until an acceptable response is registered. Thus, the system requires verification by parameter sensors that the recommended action has been effective. The operator may enter an "OVERRIDE" response, and thus advance to the next step, but he is aware then that the recommended action is not verified by the sensors. This feature allows the system to advance to the next step when a component which should have been operated by the recommended action does not respond. It can also help the operator identify a faulty sensor when he knows from other indications that the action taken has been successful. By requiring the operator to enter the override response, the erroneous sensor reading is brought to his attention.

If the process condition addressed by the current step is verified when the step is entered, instructions are displayed for the operator to generate a "CONTINUE" response or an "OVERRIDE" response. If the operator enters a "CONTINUE" response the program will continue to the next step in the current procedure. If an "OVERRIDE" response is entered for a current step in which the process condition is verified when the step is entered, the recommended action which would have been presented had the process condition not been verified is presented on the display together with the prompts for indicating completion of the action. This is useful where the operator knows from other information available to him that the condition is not in fact verified, and therefore a sensor is faulty. This acknowledgment of this condition will appear in the permanent record maintained by the system as discussed below.

In some instances, a recommended action may require a prolonged period of time for completion. In order that execution of the remaining steps of the procedure is not delayed, an "ACTION INITIATED" prompt is generated for such a step. When the operator generates the "ACTION INITIATED" response, indicating that the suggested action has been initiated, the system advances to the appropriate next step without waiting for verification of operator action.

Upon completion of each step, the full display at the time of completion is stored as a permanent record for later review. This is especially useful in the case of an event where it is desired later to review the actions taken by the operator. The visual representations are also stored for on-line review of the previously executed steps without interruption of the current step. This is especially useful during a shift change to apprise the incoming crew of the course of events which have led to the current condition of the facility while the prior crew continues to execute the steps of the active procedure.

Another aspect of the invention permits the operator to scan forward or backward in the active procedure, and to execute or re-execute prior steps if desired. This enables the operator to view the active procedure as a whole and provides improved flexibility.

The invention encompasses both method and apparatus for implementing the above functions.

BRIEF DESCRIPTION OF THE DRAWINGS

A full understanding of the invention can be gained from the following description of the preferred embodiments when read in conjunction with the accompanying drawings in which:

FIG. 3 is an illustration of the visual display generated for the procedure step of FIG. 2 after the operator has executed the action recommended and the process condition has become verified;

FIG. 5 is an illustration of a portion of a display in accordance with the invention showing the textual statement of operator action which is recorded at the completion of a step requiring operator action;

FIG. 6 is an illustration of a portion of a display in accordance with the invention showing the prompts which are generated between current steps;

FIG. 8 is an illustration of the display generated in accordance with the invention when a step is reexecuted; and FIG. 9 is an illustration of a portion of a display generated in accordance with the invention after a step has been reexecuted.

DESCRIPTION OF PREFERRED EMBODIMENTS

The invention is directed to improvements in the method and apparatus for monitoring the execution of process operating procedures disclosed in copending commonly owned U.S. patent application Ser. No. 825,427 filed on Feb. 3, 1986 and entitled "On-line Interactive Monitoring of the Execution of Process Operating Procedures". As in that application, the invention will be described as applied to a pressurized water reactor (PWR) nuclear power plant, but it should be realized that it has application to a variety of complex process facilities such as, for example, chemical plants, refineries and the like. In fact, it is adaptable to various facilities where a human operator is required to follow preconceived, although not necessarily rigid, step-by-step procedures, and is most useful in those facilities in which the sequence of steps depends at least in part upon current conditions in the complex process facility. It may be used in monitoring the execution of a variety of types of procedures, however, for purposes of illustration the invention will be described as applied to monitoring the execution of emergency procedures for a PWR, and specifically, the Emergency Operating Procedures developed by the Westinghouse Owners Group.

Figure 1:
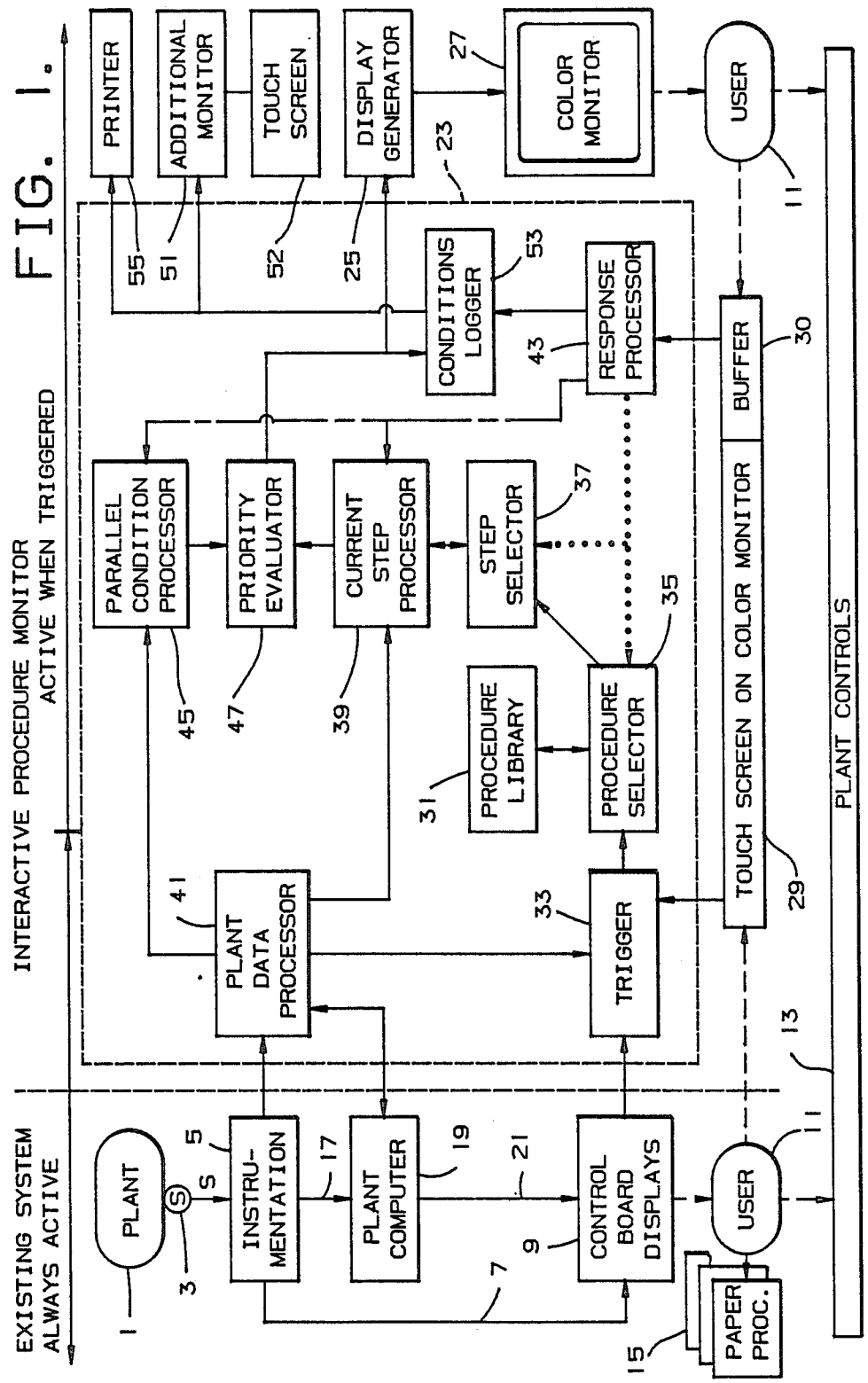
FIG. 1 is a schematic diagram of a system in accordance with the invention for machine assisted execution of procedures in a nuclear power plant.

FIG. 1 illustrates a PWR power plant adapted for implementing the above application of the invention. The plant 1 is instrumented with numerous sensors 3 which monitor various plant parameters such as temperatures, pressures, flows, radiation levels, tank levels, equipment status and the like. The signals, S, generated by the sensors are initially processed by instrumentation 5 which provides conventional signal processing such as surge protection, buffering, isolation, filtering, span control, conversion to engineering units, et cetera. Instrumentation 5 also generates logical signals representative of plant conditions of interest by comparing certain of the initially processed signals with set point values. The processed sensor signals and logical signals generated by the instrumentation 5 are supplied over the line 7 to the control board displays in the plant control room for visual presentation to the user 11, namely, the control room personnel. The control board displays 9, which are conventional, utilize the processed sensor signals to generate visual representations of the measured values of the associated parameters and the logical signals and to produce visual indications of the status of the plant conditions of interest. The operator then uses this information in analyzing the state of the plant and its various subsystems and in making decisions such as, if, when, and what adjustments should be made to the plant controls 13. In making these decisions, the operator presently has access to paper procedures 15 which provide step-by-step guidance through a logical sequence of analysis and action.

The initially processed sensor signals and the logical signals generated by the instrumentation 5 are also fed over a line 17 to plant computer 19 which performs surveillance and logging functions. This computer 19 also calculates certain parameters such as for instance the departure from nucleate boiling ratio (DNBR) and degrees of core exit coolant subcooling from the measured parameters. Some of these calculated parameters are transmitted to the control board displays 9 over lead 21 for presentation to the operator.

All of what has been described to this point is currently found in a typical PWR plant. The present invention provides improvements to the system described in U.S. patent application Ser. No. 825,427 filed Feb. 3, 1986, which in turn replaces the paper procedures 15 in providing guidance for the operator 11 in monitoring plant performance and manipulating the plant controls 13. It is an on-line tracking system which allows the operating staff to access and follow procedures in an easy, reliable and logical manner. The system performs irs functions through the execution of several concurrent but independent tasks including a read task, a main task, a parallel process task, and a display task. The read task gathers the plant parameter information and processes it for use by the main task. The main task controls the flow of the procedures and of the individual steps of the current procedure, and performs the logging functions. The parallel process task tracks system or safety conditions that may affect plant operations. The display task generates the visual displays for interfacing with the operator.

The system includes a digital computer 23 which receives sensor and logical signals from the instrumentation 5 and calculated parameter values from the plant computer 19. The computer 23 may consist of a single main frame unit with an operating system which supports real time multi-task operations, or several microprocessors linked by a data highway, with each microprocessor handling a single task. Alternatively, the software may be resident in the plant computer 19 when that unit has a dual processing capability and the capacity to perform the routines required. The computer 23 interfaces to a display generator 25 (such as a Raster Technology Model 1/80 unit) to provide the color graphics output of the procedures program on a visual display device such as a high-resolution color monitor 27. The user, or operator, 11 observes the visual display generated on the color monitor 27 and provides input to the system through a touch screen device 29 on the monitor, or an equivalent device such as a keyboard.

The architecture of the software for the system is illustrated within the broken line of FIG. 1 representing the computer 23. Central to the software package is a library 31 of subroutines or overlays, each of which embodies the logic, and as required, recommended action steps, for one procedure. This library of step-by-step procedures is stored in computer memory or in a high capacity, on-line device such as a computer disc. Operation of the system is initiated by a trigger 33 in response either to a user input from the touch screen 29, or to an indication of a particular set of plant conditions, such as a reactor trip, received from the control board displays 9 or the plant data processor 41. The trigger 33 activates a procedure selector 35 containing the necessary logic to select the appropriate procedure from the library 31 and to establish that procedure as the active procedure.

A step selector 37 sequentially selects the steps of the active procedure one at a time for a current step processor 39. Inputs to the current step processor 39 are obtained from two sources. A plant data processor 41 collects plant data, including calculated parameters from the instrumentation 5 and plant computer 19, and transforms numerical (and analog) information into logical form for use in the procedure logic. For instance, a temperature signal is transformed into a logical signal which indicates whether the current value of the temperature is above or below a given set point value. The human user provides input to the current step processor through the touch screen or equivalent device 29 and a response processor 43. User inputs usually take the form of interactive responses to specific prompts generated by the current step processor 39.

In the present invention the current step processor 39 repetitively performs the step logic. In so doing, the current step processor 39 repetitively checks the response processor 43 for an operator response to the instructions generated by the current step processor, as indicated by the dash dot line in FIG. 1. After the user response is received, the response processor communicates with the procedure selector 35 and step selector 37 to implement selection of a next step, and if necessary, a new procedure, dependent upon the user's response.

A parallel condition processor 45 operates independently of the current step processor 3 to provide parallel, concurrent monitoring of overall plant and individual system conditions in areas not directly considered by the procedure in effect. If the parallel condition processor detects an unexpected condition, such as might arise as a result of operations or casualties unrelated to the currently active procedure, a priority evaluator 47 applies a preset logic to determine whether the unexpected condition is sufficiently severe to recommend to the user suspension of the current procedure in the current step processor 39 and initiation of a different course of action involving another procedure, to treat those conditions.

In the present invention, text embedded in the logic of the current step processor 39 or the parallel condition processor 45, whichever is given priority by the priority evaluator 47, is passed to the display generator 25. The display generator accepts the specified lines of text and constructs a display image on the color monitor 27 as will be seen in more detail below. This display provides the user with information regarding plant and system status as seen both by the active procedure and by the parallel condition processor 45, with recommended action as required, and with appropriate instruction for the operator to generate user responses. The user observes the textual images produced by the display generator 25 on the color monitor 27 and communicates his desired responses by the way of the touch screen or equivalent 29, which transmits them to the response processor 43. The user's response is stored in a buffer 30, which may be incorporated in the touch screen device 29 as shown, so that the current step processor 39 can continue to repetitively execute the step logic without waiting for the user's response. User responses to action recommended by the current step processor typically result in indexing the step selector 37 to a next step in the active procedure. Responses to action recommended by the parallel condition processor 45 can result in a return to the current step, or a signal to the procedure selector 35 to transfer to another procedure.

The last piece of software in the software package is a condition logger 53 which accepts current step information and parallel condition information from the current step processor 39 and parallel condition processor 45, respectively, in addition to operator responses received from the response processor 43, and generates a complete record of the displays presented to the operator, and the operator's responses. A permanent chronological record of the displays and responses is obtained by coupling a permanent copy device, such as a printer 55, or a magnetic tape recorder or the like, to the logger 53. An additional monitor 51 provides an on-line review capability which allows the operator to scan the recorder listing while simultaneously executing procedure steps. The additional monitor 51 is provided with a touch screen 52 or other device by which a user can initiate and control the on-line review.

Figure 2:
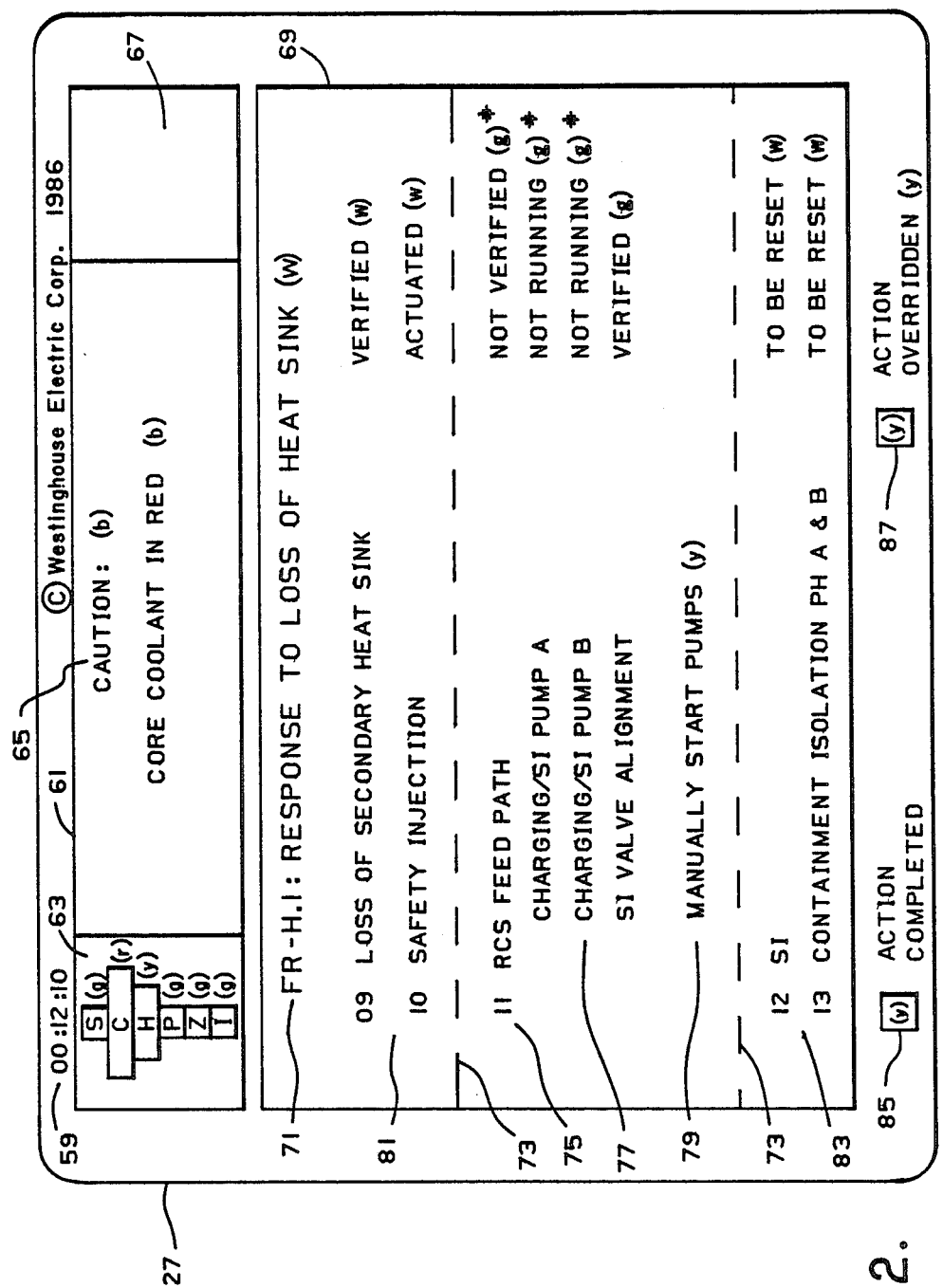
FIG. 2 is an illustration of a visual display generated by the system of FIG. 1, when the process condition addressed by the current step of a procedure is not verified.

FIG. 2 illustrates the format of a typical display generated by the display generator 25 for presentation on the color monitor 27. Working from the top to the bottom of the display, the current clock time is displayed in the upper left hand corner at 59. Information generated by the parallel condition processor is displayed in a box 61 just below the time. The system allows the user to understand overall system or safety status by displaying a summary of those items which are considered crucial in a window 63 at the left end of the box 61. This enables the users to judge at any time whether these items are satisfied or not. As shown in FIG. 2, status tree information can be displayed in this block when pertinent to the current plant condition. The details of a suitable display are discussed in the related application. It is sufficient to say that each of the six safety functions in the exemplary display are represented by a horizontal bar graph. The greater the width of the particular bar graph, the more serious the situation.

The system also allows the user to understand the status of the other conditions which require monitoring during the procedure execution. Typically, Notes and Cautions appear throughout a set of procedures. These relate to additional items which the user must remember to monitor, such as tank levels and component states. The system alleviates this burden on the operator's memory by automatically keeping track of these items. If a Note or Caution requires attention, the system informs the user of this fact along with a statement of action necessary, if any, to solve the problem, in the center window 65 of the box 61.

Should a condition arise in either the safety or system status displayed in block 63 or the continuously monitored conditions displayed in block 65 which requires user attention, a flashing indication appears in a special alert indicator window 67.

Information related to the procedure being executed is presented in the large block 69 in the center of the display. The title of the active procedure is displayed at the top of the block at 71. Information related to the current step being executed is displayed between the dashed lines 73. In order to allow the user to quickly understand the status of the current step, a high level statement of the step is presented first as at 75. In the example, the function of the procedure step 11 is to verify the reactor coolant system feed path. In this case, the condition is not verified, hence the high level statement reads "RCS FEED PATH - NOT VERIFIED". The system also informs the user of the status of the parameters or components which led to the high-level statement immediately below that statement at 77. In the example, these components are charging/safety injection pumps A and B, both of which are not running. Using the paper procedures, the operator would have to check the status of these pumps on the control board displays personally in order to then come to the conclusion that the pumps were not running. Alignment of the safety injection valves is also required to establish the RCS feed path, but in the example, valve alignment is verified.

The system also informs the user of the actions, if any, which are recommended in response to the current procedure step, through a verbal statement 79 below the component status. In the example, the recommended action is "MANUALLY START PUMPS".

To provide the operator with more perspective, the system also displays at 81 above the current step, the high-level results statement of a preselected number, in the preferred embodiment two, of the previously executed steps of a current procedure. Likewise, the high-level textual statement of the preselected number, again preferably two, of the next steps in the procedure are displayed immediately below the current step at 83.

User touch screen prompts or instructions for generating a response are presented at the bottom of the display below the block 69. Each step presents the operator with the choice of either accepting the status information and recommended action, if any, or in rejecting it. In a case such as the example shown in FIG. 2 where action is recommended, the operator accepts the recommendation by performing the action and then pressing the touch screen button 85 labeled "ACTION COMPLETED". If the operator chooses to reject the recommendation, the touch screen button 87 labeled "ACTION OVERRIDDEN" is touched.

The displays make extensive use of color coding to enhance the operator interface. Different colors are used to distinguish between parameter or component stares, required actions, and high-level statements of procedure steps. Since the figures are monochromatic as presented, the various portions of the display are succeeded by one of the following symbols, which do not appear on the display, but are used here to indicate the following color designations:
  (b) blue
  (g) green
  (w) white
  (y) yellow The prompts are presented in the same color as the recommended action so that the operator knows whether he is responding to a current step or a continuously monitored condition. Thus in the example, the prompts are yellow indicating that they are to be used for indicating responses to the recommended action in the current step which is also in yellow. Action required in connection with a continuously monitored condition would be displayed in blue as would be the prompts so that the operator knows what function the response is associated with. In order to further enhance the presentation and to highlight important conditions, reverse video is used. This is represented in FIG. 2 by the asterisk after the high-level statement and the component status statements. Color coding is also used for the status of the critical safety functions with (g) green representing the normal condition, (y) yellow representing an off-normal condition, (o) orange representing a potentially dangerous condition, and (r) red representing an existing hazardous condition.

FIG. 2 represents a typical initial display for a current step which requires operator action. Thus FIG. 2 indicates that the charging/safety injection pumps are nor operating and prompts or instructs the operator to start them. The earlier version of this system locked up at this point waiting for the operator response. When the response was received, a numerical code indicating the conditions existing at the time the step was entered and the operator response was logged, and the system advanced to the next step. Among the limitations with this approach is the lack of feedback to the operator and to the computer since the step logic is executed only once. The only way for the operator to verify that an action was complete was for him to use the step backup feature to execute the step again. Further, when the pumps had been started, the display was not updated to reflect the new status of the pumps. Without this feedback the operator may have been presented with false information. Finally the system never attempted to verify that the action was in fact complete. Instead it relied entirely on the operator's response.

In accordance with the present invention the step logic, which includes the determination of the component or condition status and the generation of the text for the display, is continuously, repetitively executed. The operator's response is stored separately in a buffer 30 or temporary storage space. If the operator has responded, the response is saved in the buffer 30, otherwise, the buffer is empty. The response processor 43 can check the buffer 30 at any time, but it need not wait for the response. Thus, while the system is waiting for the operator to generate a response to the prompt, the computer is free to perform two functions: (1) it continues to re-execute the step logic and to update the display appropriately, thus providing feedback to the operator. (2) it checks the response buffer to see if an acceptable character has been entered. Once an acceptable response is registered, the system follows one of three courses of action. If the response is to override the suggested action, the system moves on to the next appropriate step. If the response is to indicate a completed action, the system uses the plant data to determine whether the action is complete. If the action is complete, the system moves to the next appropriate step. If it is not complete, the screen updating and buffer checking resume until the next acceptable response is entered.

Thus, for the example of FIG. 2, when the operator performs the recommended action and turns on the pumps, a subsequent repetition of the step logic will detect from the sensors that the pumps are turned on, and the display will be updated as shown in FIG. 3. At this point the operator touches the "ACTION COMPLETED" button on the touch screen, and the system will advance to the next appropriate step. Had the operator touched the "ACTION COMPLETED" button under the circumstances shown in FIG. 2, the system would not have advanced since the process condition under consideration was not verified by the sensors. If due to some malfunction, one of the pumps would not start, the operator could advance to the next step by touching the "ACTION OVERRIDE" button. At least under the circumstances, he knows what the situation is, whereas with the earlier version of the system he would not have been made aware of such a malfunction by the system.

In some instances, a recommended action may require a prolonged period of time for completion. For instance, the main isolation valves may require several minutes to fully close. In order that the remaining steps of the procedure are not unduly delayed, an "ACTION INITIATED" prompt is generated for such a step. When the operator generates an "ACTION INITIATED" response, indicating that the action has been initiated, the system advances to a next step without waiting for verification of operator action.

Figure 4:
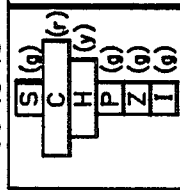
FIG. 4 is an illustration of the display generated by the system of FIG. 1 when the monitored condition addressed by a step is verified at the time that the step becomes the current step.

FIG. 4 illustrates a display generated for the next step in the current procedure in which the condition monitored by the current step has been verified at the time the step is entered. Thus, the prompts generated for the operator are labeled "CONTINUE" and "OVERRIDE". If the operator selects "CONTINUE", the system proceeds to the next applicable step. If, however, the operator selects "OVERRIDE", the recommended action which would have been presented had the condition monitored by the current step not been verified is added to the display and the prompts are replaced by "ACTION COMPLETED" and "ACTION OVERRIDDEN". Such action would be taken for instance by the operator when other information available to him such as from the control board displays indicate that the condition is not verified. This could occur for example in the case of a faulty sensor. Thus the system allows the operator to remain in control at all times.

It should be noted that Step 12 shown in FIG. 4 is somewhat different from that in FIGS. 2 and 3 in that the monitored parameter, SI RESET is at the level of the high level statement and there are no supporting components or parameters. This does not affect execution of the step, however.

Upon receipt of an acceptable response from the operator, the response processor 43 activates the conditions logger 53 to record the contents of the current display exactly as the operator sees it, except that the operator response, such as, "OPERATOR COMPLETED ACTION" as shown in the partial display of FIG. 5, or "OPERATOR OVERRODE ACTION" et cetera, is recorded rather than the prompts. Hence, a permanent record is made of the time, the representation of the status tree status, any caution text which appears in the caution text window, the procedure title, the current step information, including the high-level statement and all plant status information as displayed for the user on the display, high-level results statements of the preceding two steps and high-level textual statements of the following two steps, and the operator's response to the system prompts. It is clear then, that the record generated by the invention is far more complete and understandable than the cryptic summary of the condition of the plant and/or the operator's responses for each step recorded by the earlier version of the system which required the use of both the paper version of the procedure and the listing of the program to interpret.

Recording is performed immediately following every acceptable operator response. Hence, the information stored by the recorder is that confirmed or rejected (override option) by the operator. Since an operator response is required to all prompts, recorded entries are not limited simply to step execution; they include all interaction with the parallel process functions as well.

The conditions recording is accomplish by calling a subroutine at the end of every acceptable operator response. In the procedures subroutines, all the text which is displayed for the operator is stored in text buffers. When the conditions recording subroutine is called, it recreates the operator display using the information stored in the text buffers. A listing is built, line by line, by spacially locating the text strings and the text buffers so as to simulate the display as seen by the operator. As each line is built, it is written to an appropriate storage device 55 such as disc drive, a magnetic tape, or line printer.

The improved recording feature is particularly valuable for post-situation review. Given some sort of accident from which procedures are used to recover, the review feature allows an expert to conveniently inspect and verify every action taken by the operator. This feature is also valuable when training new operators as the instructor can constructively comment on a new operator's recovery by reviewing the recorder listing.

Another feature of the present invention is the ability to view the procedure as a whole. The earlier version of the system presented to the user the high-level results statements of a small number, preferably two, of the previous steps and high-level textual statements of the steps to be executed in the future, assuming normal order of execution. The present system has this capability as well, as seen from FIGS. 2 through 4. It also enables the operator, on request, to scan the high-level textual statements of all of the steps of the current procedure. This can help the operators anticipate steps to be executed in the future. It can also help them understand the intent of a given procedure. This feature can be further used to re-execute a prior step.

Figure 7:
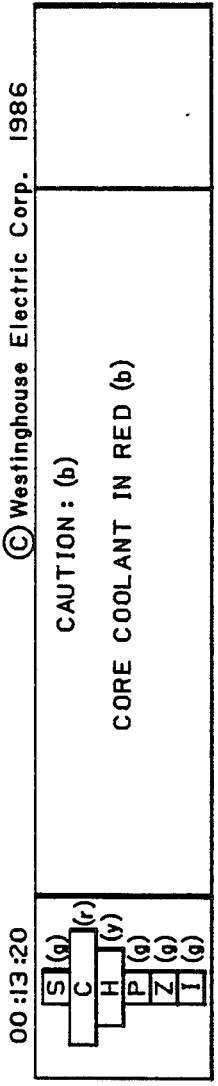
FIG. 7 is an illustration of a display generated by the system of FIG. 1 in accordance with the on-line review feature.

Scanning the high level textual statements of all of the steps of the current procedure is accomplished by accessing the library of steps stored in a file. The scanning option is presented to the operator at the completion of each step. As shown by the partial display in FIG. 6 the operator is presented with prompts which provide a choice between proceeding to the next step in the sequence or selecting another step by scanning forward or backward. If the "FORWARD/BACKWARD" button is touched, the operator is then presented with four options as shown in FIG. 7. The operator can scan forward or backward by touching the "FORWARD" or "BACKWARD" buttons respectively. The high level statement of the step selected appears in yellow above the touch buttons. In the example of FIG. 7, the operator as indexed back to step 11. The operator can return to the point in the procedure prior to requesting a scan of the steps, by touching the "RETURN TO MAIN MENU" touch button. Since step 11 is a prior step, the operator also has the option of reexecuting the step by touching the "EXECUTE" touch burton. This option is only available with a prior step so that the operator cannot easily jump over steps which have not yet been executed.

Upon touching the "EXECUTE" button the operator is presented with the display shown in FIG. 8 wherein step 11 is shown as the current step. While this display is very similar to that of FIG. 3, there is a noticeable difference. Namely, it can be seen that the two high-level statements of previous steps are for steps 11 and 12 which indicate to the operator where he was in the procedure when backward scanning was requested. The two subsequent steps presented are the steps 12 and 13 which follow the step which is being re-executed. Since the condition addressed by step 11 is verified, the operator is presented with the "CONTINUE" and "OVERRIDE" prompts, as would be presented for any verified step. Upon selecting a response, the operator is presented with the option of continuing in sequence to the next step or returning to the main menu as shown in FIG. 9. If "RETURN TO MAIN MENU" is selected, the prompts of FIG. 6 would be presented again offering the choice to advance to the next step after the step from which the scan was initiated, step 13 in the example, or of scanning forward or backward again.

In addition to the permanent chronological record, additional records are maintained for on-line review of plant conditions throughout an event and corresponding operator actions. The on-line review feature is called by an on-line review signal generated at the additional monitor 51 by a touch screen 52 or other input device. This feature permits the operator to review the previously executed steps on the additional monitor 51 simultaneously with the execution of the current step using the color monitor 27 so that operation of the system is not interrupted. The additional monitor 51 can be replaced by, or supplemented with, a printer, if a permanent copy of a past step or series of steps is desired. The on-line review feature is particularly useful during shift changes in the plant. The incoming operator need only use the review feature to learn the recent course of events and prepare for the upcoming shift. If the operator should forget something learned during the initial review, the listing can be reviewed again. This relieves both the exiting and incoming operators from having to commit a large amount of information to memory.

The on-line review feature is accomplished by the digital computer 23 utilizing three additional files which may be referred to as files A, B, and C. Let file C be the summary file which contains a complete listing of all the conditions and operator actions. This file contains the same information as the conditions recording which is used strictly for archival purposes, as described above. Files A and B are temporary files used to gather the information generated in a manner similar to that used in the conditions recording subroutine. These files alternatively receive information from the subroutine and dump information to file C, the file which the operator reviews. Consider the situation in which file A is currently open and being written to by the subroutine, and files B and C are closed. When the operator desires to use the on-line review feature, such as by entering a request through a touch screen on the additional monitor 51, file B is opened and becomes the receiving file for new information. File A is closed and appended at the end of file C. File C is then opened for review by the operator using a file review subroutine. When the operator has completed his review, file C is closed. At the next on-line review, the situation proceeds as described above with the roles of files A and B reversed. With this approach, file C always contains a complete listing of the current event conditions, which is available for operator examination.

In summary, the present invention provides a more powerful computer based system for assisting an operator in executing procedures for a complex process facility. In particular, the use of buffering allows for continuous plant data monitoring and continuous re-execution of procedure logic to provide feedback to the operator and verify operator action. The use of text strings in a conditions recording subroutine generates a more complete and understandable record of plant conditions during an event in the form of a copy of the screen as the operator sees it. The provision of an override feature allows the operator to maintain control of the procedure and assists in identifying and making a record of faulty sensors. The use of multiple files in a review subroutine provide the capability for on-line review of the plant conditions record. Finally, the use of a high level textual statement file and a scanning subroutine provide the ability to view the high level textual statements of the procedure steps.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A machine assisted method of executing procedure steps for a complex process facility comprising the steps of:
   storing electric signals representative of logic for step-by-step procedures for the complex process facility, at least some steps of which require verification of a selected process condition;
   generating parameter signals representative of the real-time value of predetermined process parameters;
   sequentially electrically selecting a step of one of said stored step-by-step procedures as a current step;
   repetitively electrically executing the logic for the current step including processing selected parameter signals to determine the real-time state of the process condition to be verified by a current step which requires verification;
   generating a visual representation of said current step including a visible textual statement of the condition to be verified, a visual indication of the real-time state of the selected process condition to be verified by the current step, and, where the state of the selected condition indicates that it is not verified, a visible textual statement of recommended operator action;
   electrically generating instructions for the operator to electrically generate an operator response signal indicating completion of the recommended action in response to a textual statement of recommended operator action;
   repetitively updating the visual indication of the state of the selected process condition to be verified by the current step in response to changes in the selected process condition, including changes as a result of operator response to the recommended action; and
   electrically selecting a next step in said one stored step-by-step procedure in response to an operator response signal indicating completion of the recommended action only for such a response signal generated after a repetition of said parameter signal processing step indicates that the process condition has become verified.

2. The method of claim 1 wherein said step of electrically generating instructions for the operator to electrically generate a response signal includes generating instructions for the operator to alternatively electrically generate an override signal, and wherein the step of selecting a next step in said one step by step procedure includes selecting a next step in response to an override signal when the state of said selected process condition is not verified by the current step.

3. The method of claim 2 wherein the step of selecting the next step includes electrically generating instructions for the operator to electrically generate a next sequential step response signal for selecting the next step sequentially in the step by step procedure and for alternatively generating another step response signal for selectively scanning forward and backward through the steps of said one procedure to select another step in said procedure, and selecting the next step sequentially in response to a next sequential step response signal and for selecting said another step in response to said another step response signal.

4. The method of claim 3 including, in response to said another step response signal which selects a step in said step by step procedure prior to the current step, electrically generating instructions for said operator to selectively, electrically generate an execute response signal, and repeating the parameter processing, visual representation generating, operator response signal instruction generating and updating steps, to execute said prior another step in response to a execute response signal.

5. The method of claim 4 including electrically generating instructions for the operator to electrically generate a sequence to next step signal and alternatively a return signal following selection of said another step and electrically selecting the step sequentially after said another step as the next step in response to a sequence to next step signal, and electrically selecting the next step sequentially after the last current step as the next step in response to a return signal.

6. The method of claim 2 including, in response to an override response signal when the real-time selected process condition is verified, electrically generating a visual representation of the recommended action for the current step which would have been generated had the real-time selected process condition not been verified.

7. The method of claim 2 including prior to electrically selecting a next step, electrically recording the textual statement of the condition to be verified, the indication of the real-time condition of the selected process condition to be verified, the textual statement of recommended operator action where applicable, and the response signal generated by the operator.

8. The method of claim 7 including electrically monitoring along with the repetitive processing of said parameter signals for said current step, parameter signals representative of the real time status of a predetermined parallel process condition in addition to the process condition to be verified by the current step, and electrically generating a visual representation of the status of said parallel process condition, and wherein said recording step includes electrically recording said visual representation of said parallel process condition.

9. The method of claim 2 including electronically recording the visual representation of each step following the generation of an operator response signal, electrically generating instructions for an operator to generate an on-line review signal, and along with generation of a visual representation and execution of the current step, generating a visual representation of a recorded step in response to an on-line review signal.

10. The method of claim 9 wherein the step of electrically recording the visual representations of each procedure step includes designating one of two temporary files as an active file, recording the visual representations of successive procedure steps in the active file, and in response to an on-line review signal, designating the other temporary file as the active file for recording the visual representations of subsequent procedure steps, dumping the visual representations stored in the temporary file previously designated as active into a summary file, generating visual representations of the procedure steps in the summary file, and alternating the temporary file designated as the active with each subsequent on-line review signal.

11. The method of claim 1 wherein the operator action recommended by a current step requires a prolonged period of time to effect a change in the selected process parameter which determines the real-time condition of the process condition to be verified, wherein the step of electrically generating operator instructions includes generating an instruction for the operator to generate an action initiated response signal in response to the recommended action requiring a prolonged period of time to effect a change, and wherein the step of electrically selecting a next step includes electrically selecting a next step in response to said action initiated response signal even though the process condition for the current step is not verified.

12. Apparatus for assisting an operator in the execution of procedure steps in a complex process facility comprising:
a plurality of sensors for generating sensor signals representative of the real-time value of a plurality of facility parameters;
storage means for storing electrical signals representative of the logic for the procedure steps of a plurality of step-by-step procedures;
a digital computer programmed to sequentially select stored signals representative of the logic of a selected one of said procedure steps of one of said plurality of step-by-step procedures as a current step, to repetitively process selected sensor signals to determine the status of a process condition selected by the current step, and to provide recommended action when the process condition is not verified by the sensor signals;
a display device controlled by the digital computer for generating a visual display indicating the current step, the real-time status of the selected process condition, any recommended action, and instructions for an operator to generate an action completed response signal, and alternatively, an override response signal; and
input means by which the operator generates an action completed response signal, and alternatively, an override response signal, said digital computer being further programmed to select the stored signals representative of another step in the selected step-by-step procedure as the current step in response to an action completed response signal only when such a response signal is generated after a repetition of said sensor signal processing indicates that the selected process condition is verified, and to select another step as the current step in response to an override signal without verification by the sensor signals of the selected process condition.

13. The apparatus of claim 12 including an on-line review device and means for generating an on-line review signal, and wherein said digital computer is further programmed to store signals representative of the visual display generated for each current step executed, and in response to the on-line review signal to send said stored signals to said on-line review device for selectively reproducing the displays generated for the stored steps while continuing the repetitive processing for the current step.

14. A machine assisted method of executing procedure steps for the operation of a nuclear power plant comprising the steps of:
storing electric signals representative of logic for step-by-step procedures for the plant, at least some steps of which require verification of a selected plant condition;
generating parameter signals representative of the real-time value of predetermined plant parameters;
operating a digital computer to sequentially select a step of one of said step-by-step procedures as a current step and to repetitively execute the logic for the current step including processing selected parameter signals to determine the real-time status of the plant condition to be verified by a current step which requires verification, and generating text strings representative of said real-time status of the plant condition to be verified, of the value of the selected parameter signals, of recommended operator action where the plant condition is not verified, and of instructions for the operator to generate a recommended action complete operator response signal, and alternatively, an action overridden operator response signal;
generating a visual display of said text strings on a display device for observation by said operator;
storing an operator response signal in a buffer; and
further operating said digital computer in repetitively executing the logic for said current step to update the real-time status of the selected plant condition and said text strings in response to changes in the selected plant condition, including changes as a result of operator response to the recommended action, to periodically check the buffer for a stored operator response signal, and to select a next step of the one step-by-step procedure as the current step in response to an action completed operator response signal only for such a response signal generated after a repetition of said logic indicates that the plant condition has become verified, and selecting a next step as the current step in response to an action overridden operator response signal without verification of said selected plant condition.

15. The method of claim 14 including operating said digital computer to monitor other parameter signals to determine the real-time status of other specified plant conditions not selected by the current step simultaneously with the repetitive execution of the logic for the current step, and to generate additional text strings representative of the status of said other specified plant conditions; said step of generating a visual display including generating a display of said additional text strings, and said method further including before selecting a next step, storing for later retrieval recorded sets of signals representative of the text strings for the current step, of the additional text strings, and of the operator response signal for each executed step.

16. The method of claim 15 including: providing means for an operator to generate a scan signal for selecting an executed step for on-line review, and further operating said digital computer to, along with the repetitive execution of the logic for the current step, select in response to the scan signal, the recorded set of signals for the selected executed step, and generating on an additional display device a visual display from the selected recorded set of signals simultaneously with the generation the first mentioned display device of the visual display of the text strings for the current step.

17. The method of claim 16 including further operating said digital computer to store said recorded sets of signals in a permanent file for later retrieval and to also store them in an active one of two temporary files, to transfer the recorded sets of stored signals in said active temporary file to a summary file in response to a scan signal, to then designate the other temporary file as the active temporary file and store subsequent recorded sets of signals therein, and to scan the summary file to select the recorded sets of signals for the selected executed current step, whereby said temporary files alternately serve as the active temporary file and dump their contents into the summary file upon generation of a scan signal.

* * * * *